United States Patent [19]

Renner et al.

[11] Patent Number: 5,519,121

[45] Date of Patent: May 21, 1996

[54] TRIAZINYL-AMINO BRIDGE-CONTAINING DISAZO DYESTUFFS

[75] Inventors: Gerd-Friedrich Renner, Kürten-Biesfeld; Peter Wild, Odenthal; Karin Hassenrück, Düsseldorf, all of Germany

[73] Assignee: Bayer Aktiengesellschaft, Leverkusen, Germany

[21] Appl. No.: 393,761

[22] Filed: Feb. 24, 1995

[30] Foreign Application Priority Data

Mar. 3, 1994 [DE] Germany .................. 44 06 950.2

[51] Int. Cl.$^6$ .................. C09B 33/02; C09B 43/16; C09B 67/24; C09D 11/02
[52] U.S. Cl. .................. 534/797; 534/728; 534/598; 534/637; 8/527; 8/681; 8/918; 8/919; 8/924; 106/22 K
[58] Field of Search .................. 534/797, 728; 8/919, 918, 924, 527, 681; 106/22 K

[56] References Cited

U.S. PATENT DOCUMENTS 5,006,128  4/1991  Pedrazzi .................. 534/797 X
5,328,995  7/1994  Schaulin et al. .................. 534/797

FOREIGN PATENT DOCUMENTS 2036780  7/1980  United Kingdom .

OTHER PUBLICATIONS

Derwent Abstract of JP-60-243,174, (Dec. 3, 1985).

H. Rath and S. Muller, Textilberichte, 40, 787–792 (1959).

Daruwalle in Venkataraman, The Chemistry of Synthetic Dyes, vol. VII, pp. 86–92 (1974).

*Primary Examiner*—Fiona T. Powers
*Attorney, Agent, or Firm*—Sprung Horn Kramer & Woods

[57] ABSTRACT

Novel dyestuffs of the formula (I)

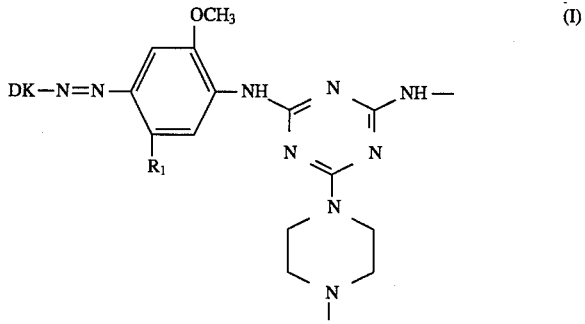

in which DK denotes a radical of the formula

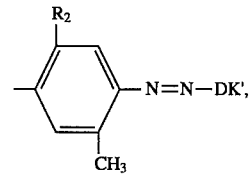

where m is 1 or 2 and DK' denotes a radical of the formula

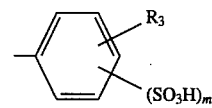

where n is 1 or 2

$R_1$ represents hydrogen or substituted or unsubstituted $C_1$–$C_4$-alkoxy, $C_1$–$C_4$-alkyl, $R_2$ represents hydrogen, substituted or unsubstituted $C_1$–$C_4$-alkyl or $C_1$–$C_4$-alkoxy, $R_3$ represents substituted or unsubstituted $C_1$–$C_4$-alkyl, $C_1$–$C_4$-alkoxy or $C_1$–$C_4$-acylamino and $R_4$ represents substituted or unsubstituted $C_1$–$C_4$-alkyl.

have now been found.

The invention also relates to a process for their preparation and to their use for dyeing/coloring and printing textiles and paper, in particular in printing inks containing these dyestuffs.

8 Claims, No Drawings

TRIAZINYL-AMINO BRIDGE-CONTAINING DISAZO DYESTUFFS

The invention relates to anionic disazo compounds having a triazinylamino bridge and to salts thereof, to a process for their preparation, to their use in dyeing and printing processes as direct dyestuffs and to dyeing preparations containing these dyestuffs.

EP-A 357,560, DE-A 2,851,787 and JP-A 60,243,174 have already disclosed disazo dyestuffs having a triazinylamino bridge which, however, still had to be improved. Compounds of the formula I

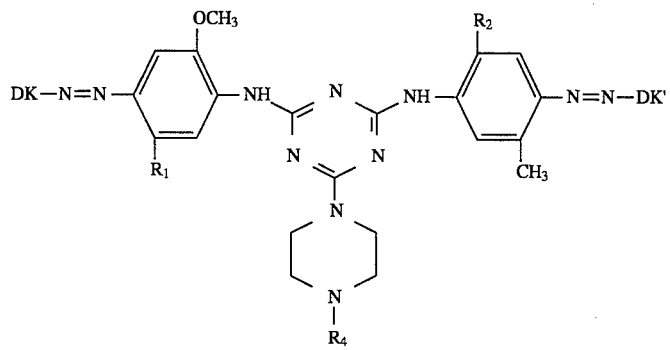

in which DK denotes a radical of the formula

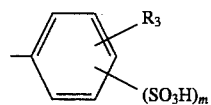

where m is 1 or 2 and DK' denotes a radical of the formula

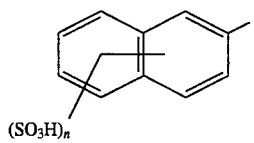

where n is 1 or 2

$R_1$ represents hydrogen or substituted or unsubstituted $C_1$–$C_4$-alkoxy, $C_1$–$C_4$-alkyl, in particular methyl, ethyl or methoxy, $R_2$ represents hydrogen, substituted or unsubstituted $C_1$–$C_4$-alkyl or $C_1$–$C_4$-alkoxy, in particular methyl or methoxy, $R_3$ represents hydrogen, substituted or unsubstituted $C_1$–$C_4$-alkyl, $C_1$–$C_4$-alkoxy or $C_1$–$C_4$-acylamino, in particular methyl, methoxy and acetylamino, $R_4$ represents substituted or unsubstituted $C_1$–$C_4$-alkyl have now been found.

Examples of possible substituents of the alkyl or alkoxy radicals as $R_1$ to $R_3$ include hydroxyl groups.

Moreover, the alkyl radicals can also be substituted by $C_1$–$C_4$-alkoxy radicals.

However, in a preferred embodiment, the alkyl and alkoxy radicals of $R_1$ to $R_3$ are unsubstituted.

Preference is given to dyestuffs of the formula (I) in which $R_4$ denotes a $C_1$–$C_4$-alkyl which is unsubstituted or substituted by hydroxyl, amino, a $C_1$–$C_4$-alkyl ether which, if desired is alkylated by $C_1$–$C_4$-alkyl or is substituted by hydroxy- $C_1$–$C_4$-alkoxy, in particular β-hydroxyethoxy.

In the 2-naphthyl radical given in the definition for DK', the sulpho groups are preferably in the 4, 5, 6, 7 and 8 positions.

Preference is given to compounds of the formula (I) having the formula (II)

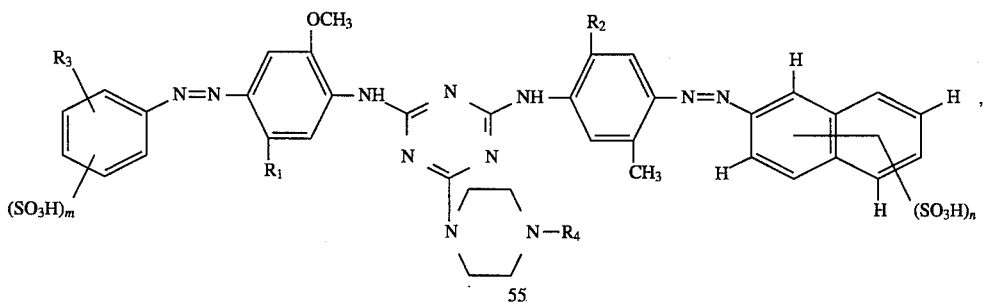

in which $R_4$ represents methyl, ethyl, 2-hydroxyethyl or 2-aminoethyl and m+n is 3 and $R_1$, $R_2$ and $R_3$ have the abovementioned meaning.

Particular preference is given to compounds of the formula (I) having the formula (III)

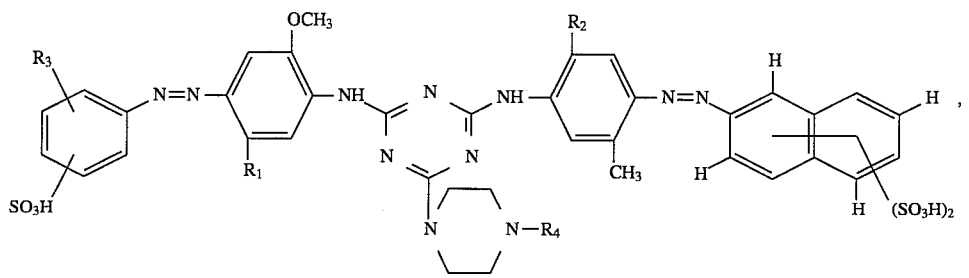

in which

R₄ represents methyl, ethyl, 2-hydroxyethyl or 2-aminoethyl and the sulpho groups in the naphthyl radical are in the 4, 8 or 6, 8 positions and $R_1$, $R_2$ and $R_3$ have the above meaning.

In a preferred embodiment, $R_4$ is such that the hydroxyl or hydroxyalkoxy group in a hydroxyl- or hydroxyalkoxy-substituted alkyl group bonded to the N atom is preferably not on the N atom adjacent to the C atom. Likewise, the hydroxyl group in a hydroxyalkoxy group is preferably not on a C atom adjacent to the O atom.

In a very particularly preferred embodiment, $R_1$ denotes hydrogen, methyl, ethyl or methoxy, $R_2$ denotes hydrogen, methyl or methoxy and $R_3$ denotes hydrogen, methyl or methoxy.

The compounds of the formula I can be present as free acid, as the salt of alkali metals, such as lithium, sodium or potassium, or as substituted or unsubstituted ammonium salt, suitable salts including in particular mixed salts. If the cation is a substituted ammonium ion, it can be derived from a primary, secondary of tertiary amine, examples of suitable amines including: mono-, di- or trimethyl-, -ethyl-, -propyl- or -butylamine; mono-, di- or tri-ethanol-, -propanol- or -isopropanol-amine; N-methyl-N-hydroxyethylamine, N-methyl-N,N-di (hydroxyethyl)amine, N-ethyl-N-hy-droxy-ethoxyethylpiperazine; ethylenediamine, hexamethylenediamine; dimethylaminopropylamine, diethylaminopropylamine, diethylene glycolamine and 3-methoxypropylamine. Suitable amines also include polyglycolamines which may be obtained, for example, by reacting ammonia, alkyl- or hydroxyalkylamine with alkylene oxides.

The cation present as substituted ammonium ion can also be a quaternary ammonium ion derived from ammonium compounds preferably containing one or two quaternary ammonium ions; examples include: tetramethyl-, tetraethyl-, trimethylethyl-, dimethyl-di (2-hydroxypropyl)-, trimethylhydroxyethyl-, tetrakis(hydroxyethyl)-) and trimethylbenzyl-ammonium hydroxide.

The invention also provides a process for preparing the compounds of the formula (I), which is characterized in that a compound of the formula (IV), in which DK, DK', $R_1$ and $R_2$ are as defined above and Hal represents halogen, in particular F, Cl and Br and very particularly preferably F and Cl, is reacted with a piperazine of the formula (V)

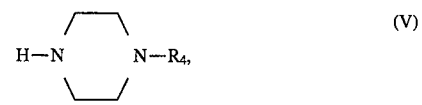

in which $R_4$ is as defined above.

This condensation is carried out by methods known per se and takes place under the conditions customary for the exchange of the third halogen atom on the triazine ring.

The condensation is preferably carried out in aqueous medium at a pH of 7–12 and a temperature of 60°–100° C.

The compounds of the formula (IV) used as the starting material can be obtained by reacting cyanuric halide stepwise with the corresponding monoazo compounds where the latter can in turn be obtained by diazotization and coupling of suitable coupling and diazo components.

The reaction conditions used when replacing the first and second halogen atom on the triazine are also the customary ones.

Not only the monoazo compounds used for this but also the piperazines of the formula (V) are compounds which are known per se or can be obtained analogously to processes known per se.

The invention furthermore relates to intermediates of the formula (IV) in which the substituents have the above-mentioned meanings.

The dyestuffs of the formula (I) according to the invention can be provided for various applications. Thus, for example, they are suitable for dyeing and printing textile fibres and also for colouring and printing paper and for use in inks.

Thus, the compounds according to the invention are used in the form of their water-soluble salts for dyeing or printing hydroxyl- or nitrogen-containing organic substrates for example, such as for dyeing or printing fibres, filaments or textiles produced therefrom which consist of natural or synthetic polyamides or of natural or regenerated cellulose material, for example cotton, or contain them, using methods known per se; of these, cotton is preferably dyed by the exhaust method, for example from a long or short liquor and at room to boiling temperature.

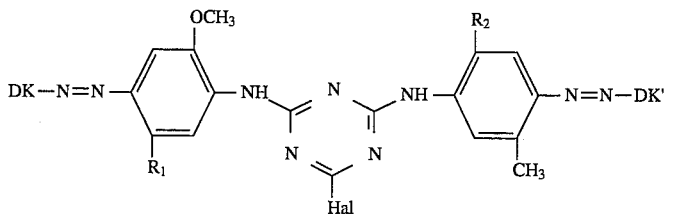

Printing takes place, for example, by impregnation with a printing paste put together by a method known per se.

A preferred use of the dyestuffs of the formula (I) according to the invention is the production of inks by a method known per se. However, the compounds of the formula (I) are particularly suitable for colouring or printing paper, for example for producing mass-coloured, sized or unsized paper. However, they can also be used for colouring paper by the dipping method or in a sizing press. The colouring and printing of paper takes place by known methods.

The coloration and prints obtained in each case, in particular those obtained on paper, exhibit good general fastness properties.

The compounds of the formula (I) can also be used in the form of dyeing preparations and printing inks, for example for ink-Jet printing (for example using the bubble-jet or piezoelectric method). This form of application is preferred in particular for colouring paper. Their conversion into stable liquid, preferably aqueous, concentrated dyeing preparations can take place in a generally known manner, advantageously by dissolving them in suitable solvents, if appropriate with the addition of an auxiliary, for example of a hydrotropic compound. A particular advantage is the fact that such stable aqueous concentrated preparations can be prepared from the synthesis solution of the dyestuff itself, i.e. without intermediate isolation of the dyestuff.

Examples of suitable hydrotropic auxiliaries are low-molecular-weight amides, lactones, alcohols, glycols or polyols, low-molecular-weight ethers or alkoxylation products and nitriles or esters; of these, methanol, ethanol, propanol; 1,5-pentanediol, ethylene glycol, propylene glycol, diethylene glycol, thiodiethylene glycol and dipropylene glycol; butanediol; β-hydroxypropionitrile, pentamethylene glycol, ethylene glycol monoethyl ether and ethylene glycol monopropyl ether; ethylene diglycol monoethyl ether, triethylene glycol monobutyl ether, butylpolyglycol formamide, dimethylformamide, pyrrolidone, N-methylpyrrolidone, glycol acetate, butyrolactone, urea and ε-caprolactam.

Hydrotropic compounds are described, for example, in H. Rath and S. Müller, Melliand Textilberichte 40, 787 (1959) or by E. H. Darwalle in K. Vekataraman, The Chemistry of Synthetic Dyes, Vol. VIII, p. 86–92 (1974).

The additional presence of up to 20% by weight, in particular 5 to 20% by weight, of a hydrotropic compound further improves the shelf life of the dyestuff preparation and the solubility of the dyestuff used.

The compounds of the formula (I) obtained by the preparation process according to the invention can also be provided for further use in the form of their synthesis solution; however, the solution can also be converted into a solid dyestuff preparation by spray-drying. Furthermore, the method of isolation customary for dyestuffs, namely salting out from the solution, filtering off and drying, is also suitable.

The type of cations associated with the sulpho groups in a compound of the formula I can be affected in various ways according to the process these are known per se. It is in particular possible to obtain mixed salts by a selective control of the preparation process used.

The coloration and prints on paper exhibit good light fastness, and, after prolonged exposure to light, the shade undergoes anon-tone change. They possess very good wet fastness to water, milk, fruit juices, sweetened mineral waters and tonic water and they also have good fastness to alcohols. The dyestuffs exhibit high substantivity, i.e., they are absorbed virtually quantitatively whilst showing good build-up properties they can be added directly, i.e., without prior dissolution, to the paper material as a dry powder or as granules without lowering the brilliance or reducing the colour yield. However, it is advantageous to use solutions of the dyestuffs as mentioned above which are stable and have low viscosity, which makes them very easy to meter.

The paper colorations using the dyestuffs described can also be produced in soft water. Moreover, fibre materials containing wood pulp can be dyed in good quality.

The following examples serve to illustrate the invention. Unless stated otherwise, parts and percentages in the examples are by weight or volume; temperatures are given in degrees centigrade.

EXAMPLES

Example 1

112.4 g (0.2 mol) of the coupling product (content 74.94%) obtained from 2-amino-naphthaline-4,8-disulphonic acid and m-toluidine are stirred in 500 ml of water and dissolved at room temperature at a pH of 8.5 using 18 ml of 40% strength aqueous sodium hydroxide solution. The mixture is then cooled to 0°–5° C., and 40.6 g (0.21 mol) of cyanuric chloride are added in portions. During the reaction lasting more than 6 hours the pH is maintained at 8 with 10% strength sodium hydroxide solution. 121.5 g (0.2 mol) of the coupling product (content 50.5%) obtained from m-sulphanilic acid and o-anisidine in 500 ml of water are then introduced at room temperature. The pH is likewise maintained at 8. After metered addition is complete, the mixture is heated to 60° to 70° C. over a period of 30 minutes and stirred at this temperature for another 6 hours.

The dyestuff which is in the form of the free acid of the formula

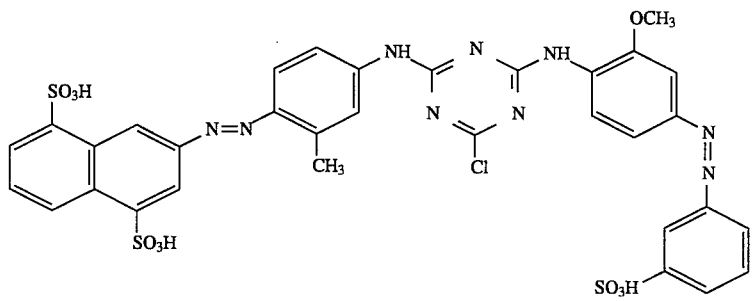

precipitates and can be filtered off with suction. However, the further reaction can also take place without isolation of the intermediate.

Example 2

45.2 g (0.4 mol) of ethylpiperazine are added to the reaction mixture of Example 1, and the combined mixture is heated to 100° C. To prevent the pH from dropping below 8.5, another 39.6 g (0.35 mol) of ethylpiperazine are additionally metered in. After 5 hours, the mixture can be cooled to 80° C. It is brought to a pH of 6 with hydrochloric acid and cooled to room temperature. The dyestuff crystallizes (or can be salted out) is filtered off with suction, and dried in vacuo at 60° C. In the form of the free acid, the dyestuff has the formula strength aqueous sodium hydroxide solution. The mixture is then cooled to 0° to 5° C., and 40.6 g (0.21 mol) of cyanuric chloride are added in portions. During the reaction lasting more than 6 hours the pH is maintained at 8 with 10% strength sodiumhydroxide solution. 121.5 g (0.2 mol) of the coupling product (content 50.5%) obtained from m-sulphanilic acid and o-anisidine in 500 ml of water are then introduced at room temperature. The pH is likewise maintained at 8. After metered addition is complete, the mixture is heated to 60° to 70° C. over a period of 30 minutes and stirred at this temperature for another 6 hours.

At this point, the reaction product can be isolated by cooling the reaction mixture to room temperature. The product precipitates and can be filtered off with suction.

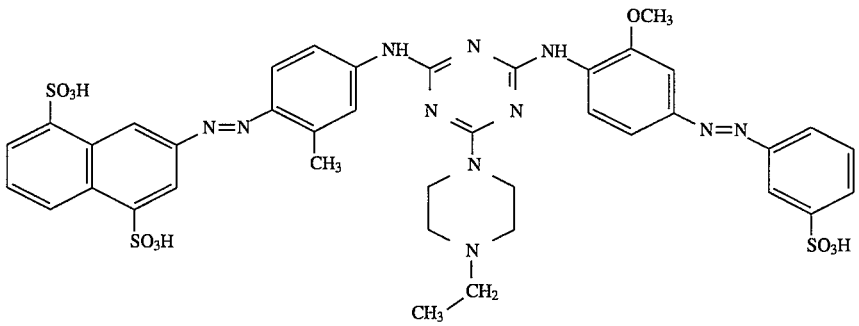

Example 3

51.2 g (0.4 mol) of hydroxyethylpiperazine are added to the react ion mixture of Example 1, and the combined mixture is heated to 100° C. To prevent the pH from dropping below 8.5, another 44.8 g (0.35 mol) of hydroxyethylpiperazine are additionally metered in. After 5 hours, the mixture can be cooled to 80° C. It is brought to a pH of 6 with hydrochloric acid and cooled to room temperature. The dyestuff crystallizes (or can be salted out) is filtered off with suction, and dried in vacuo at 60° C. In the form of the free acid, the dyestuff has the formula However, the further reaction can also take place without isolation as described below.

Example 5

45.2 g (0.4 mol) of ethylpiperazine are added to the reaction mixture of Example 4, and the combined mixture is heated to 100° C. To prevent the pH from dropping below 8.5, another 39.6 g (0.35 mol) of ethylpiperazine are additionally metered in. After 5 hours, the mixture can be cooled to 80° C. It is brought to a pH of 6 with hydrochloric acid and cooled to room temperature. The dyestuff crystallizes

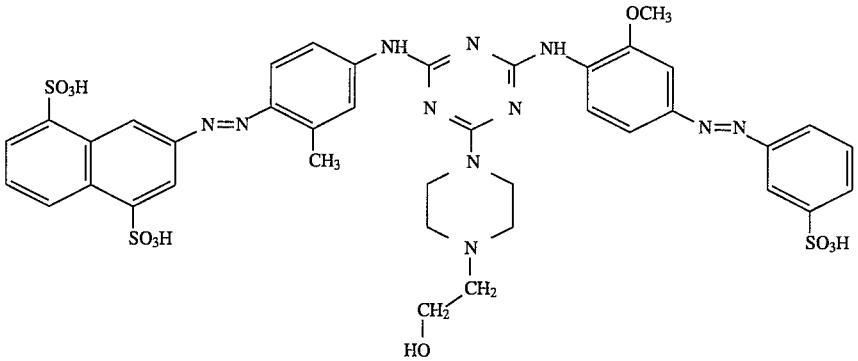

Example 4

112.4 g (0.2 mol) of the coupling product (content 74.9%) obtained from 2-amino-naphthaline-6, 8-disulphonic acid and m-toluidine are stirred in 500 ml of water and dissolved at room temperature at a pH of 8.5 using 18 ml of 40%

(or can be salted out), is filtered off with suction, and dried in vacuo at 60° C. In the form of the free acid, the dyestuff has the formula

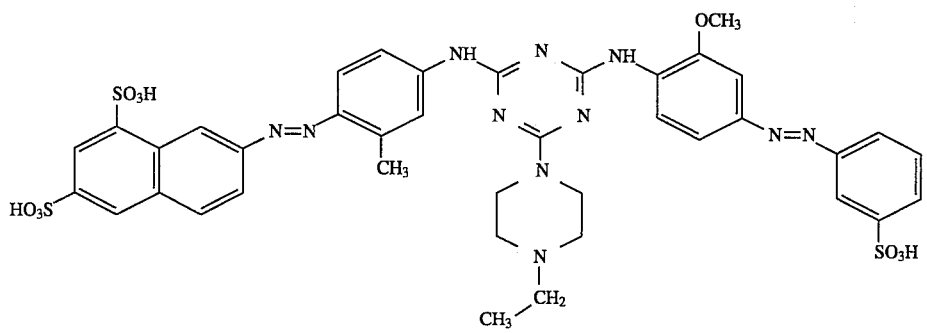

Example 6

51.2 g (0.4 mol) of β-hydroxyethylpiperazine are added to the reaction mixture of Example 4, and the combined mixture is heated to 100° C. To prevent the pH from dropping below 8.5, another 44.8 g (0.35 mol) of hydroxyethylpiperazine are additionally metered in. After 5 hours, the mixture can be cooled to 80° C. It is brought to a pH of 6 with hydrochloric acid and cooled to room temperature. The dyestuff crystallizes (or can be salted out), is filtered off with suction, and dried in vacuo at 60° C. In the form of the free acid, the dyestuff has the formula

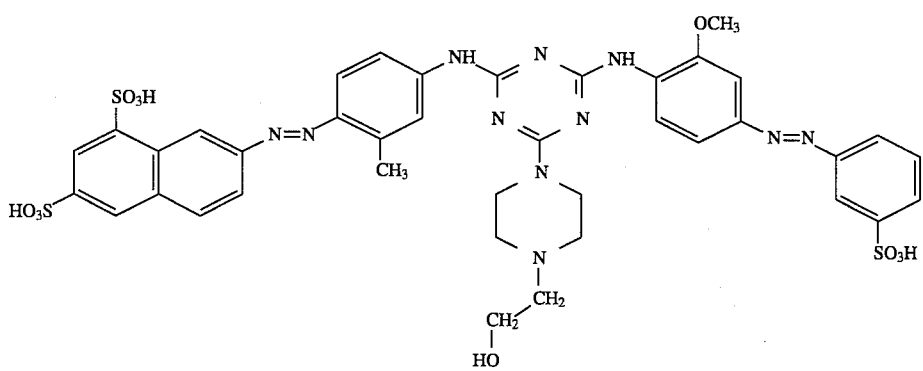

We claim:

1. A compound of the formula

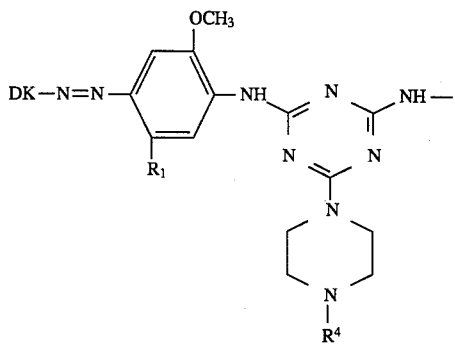
(I)

-continued

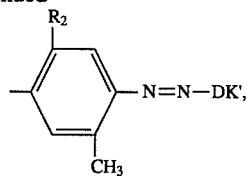

in which DK denotes a radical of the formula

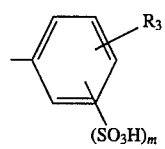

where m is 1 or 2
and DK' denotes a radical of the formula

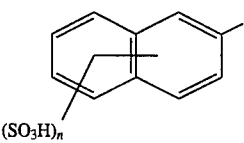

where n is 1 or 2

$R_1$ represents hydrogen or substituted or unsubstituted $C_1$–$C_4$-alkoxy, $C_1$–$C_4$-alkyl, $R_2$ represents hydrogen, substituted or unsubstituted $C_1$–$C_4$-alkyl or $C_1$–$C_4$-alkoxy, R_3 represents hydrogen, substituted or unsubstituted $C_1$–$C_4$-alkyl, $C_1$–$C_4$-alkoxy or $C_1$–$C_4$-acylamino,
R_4 represents unsubstituted $C_1$–$C_4$-alkyl.

2. A compound according to claim 1 of the formula

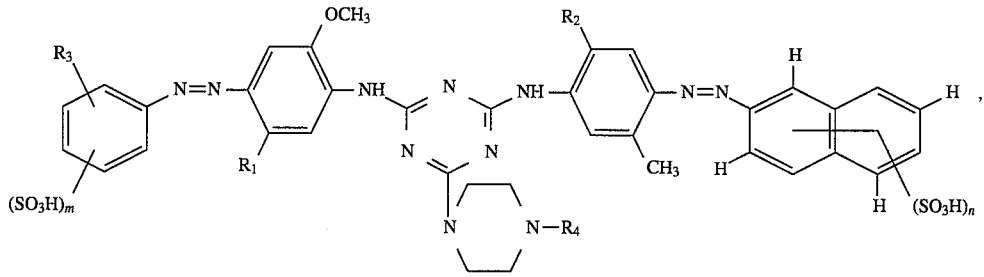

in which $R_4$ represents methyl or ethyl and m+n is 3.

3. A compound according to claim 1 of the formula

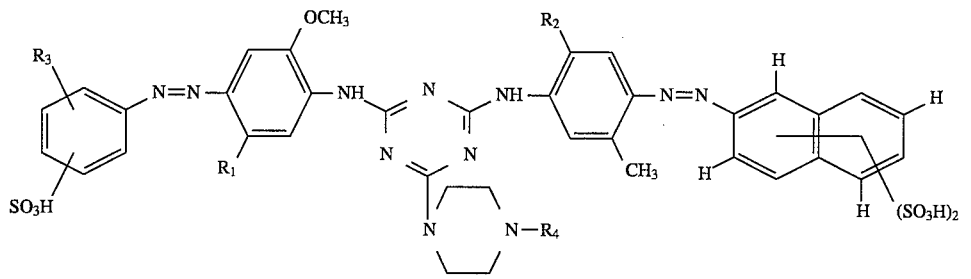

in which

R_4 represents methyl or ethyl and the sulpho groups in the naphthyl radical are in the 4, 8 or 6,8 positions.

4. A compound of the formula (I) according to claim 1, in which

R_1 represents hydrogen, methyl, ethyl or methoxy,
R_2 represents hydrogen, methyl or methoxy and
R_3 represents hydrogen, methyl or methoxy.

5. A compound according to claim 1, in which $R_3$ is methyl, methoxy or acetylamino.

6. A process for dyeing or printing hydroxyl or nitrogen containing organic substrates, wherein a dyestuff according to claim 1 is applied thereto.

7. A process for colouring and printing paper wherein a dyestuff according to claim 1 is applied thereto.

8. A dyestuff preparation, which comprises at least one dyestuff according to claim 1.

* * * * *